(12) United States Patent
Fenioux et al.

(10) Patent No.: US 8,684,342 B2
(45) Date of Patent: Apr. 1, 2014

(54) COIL SPRING (75) Inventors: Daniel Fenioux, Saleux (FR);
Nobuharu Kato, Kamlina-gun (JP);
Takeshi Yabushita, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 668 days.

(21) Appl. No.: 12/449,123

(22) PCT Filed: Jan. 25, 2008

(86) PCT No.: PCT/JP2008/000089
§ 371 (c)(1),
(2), (4) Date: Aug. 25, 2009

(87) PCT Pub. No.: WO2008/090748
PCT Pub. Date: Jul. 31, 2008

(65) Prior Publication Data
US 2010/0090384 A1    Apr. 15, 2010

(30) Foreign Application Priority Data
Jan. 26, 2007  (JP) .................................. 2007-016982

(51) Int. Cl.
*F16F 1/08* (2006.01)

(52) U.S. Cl.
USPC .......................................... 267/166; 267/180

(58) Field of Classification Search
USPC .................. 267/167, 180, 155, 166
See application file for complete search history.

(56) References Cited

U.S. PATENT DOCUMENTS

| | | | | |
|---|---|---|---|---|
| 1,523,225 A | * | 1/1925 | Lukens .......................... | 267/166 |
| 1,643,073 A | * | 9/1927 | Laughlin ....................... | 267/166 |
| 2,700,540 A | * | 1/1955 | De Juhasz ..................... | 267/180 |
| 4,735,403 A | * | 4/1988 | Matsumoto et al. .......... | 267/180 |
| 4,923,183 A | * | 5/1990 | Saka .............................. | 267/180 |
| 4,953,835 A | * | 9/1990 | Matsumoto et al. .......... | 267/180 |
| 5,080,215 A | * | 1/1992 | Forster et al. ................ | 192/3.29 |
| 5,259,599 A | * | 11/1993 | Hernandez .................... | 267/180 |
| 5,411,335 A | | 5/1995 | Driver | |
| 5,642,875 A | | 7/1997 | Albers et al. | |
| 5,823,035 A | | 10/1998 | Albers et al. | |

FOREIGN PATENT DOCUMENTS

| | | |
|---|---|---|
| JP | 54-132461 | 10/1979 |
| JP | 1-224541 | 9/1989 |
| JP | 2-038528 | 3/1990 |
| JP | 3-12635 | 2/1991 |
| JP | 6-023583 | 3/1994 |
| JP | 6-300035 | 10/1994 |
| JP | 6-300065 | 10/1994 |
| JP | 10-082440 | 3/1998 |
| JP | 3076127 | 3/2001 |

* cited by examiner

*Primary Examiner* — Bradley King
(74) *Attorney, Agent, or Firm* — Jordan and Hamburg LLP (57) ABSTRACT

A coil spring has a spring wire wound in a coil shape having an outer diameter side portion and an inner diameter side portion on a peripheral shape in a cross section thereof, one of the outer diameter side portion and inner diameter side portion formed in a semi-circular shape expressed by $x^2+y^2=b^2$, the other thereof formed in a non-circular shape with a long diameter "a" and a short diameter "b" expressed by $(x/a)^\alpha + (y/b)^\alpha = 1$, and value of the "α" set in a range of 1.85 to 2.45, and contact faces provided between the inner diameter side portion and the outer diameter side portion on the peripheral shape in the cross section such that each contact face comes into contact with a contact face of an adjacent coil in an axial direction along an axis line of the coil spring.

15 Claims, 9 Drawing Sheets

COIL SPRING

BACKGROUND OF THE INVENTION

The present invention relates to a coil spring that is used in a torsion spring for a torsional vibration absorbing device or the like.

A conventional coil spring such as a torsion spring applied to, for example, a clutch disk is made of a spring wire with a circular section wound in a coil shape. The spring wire is provided with flat faces on a peripheral shape in a cross section thereof as contact faces.

When load is applied to the coil spring until a coil shape is put in a close contact state or in a locked state, each flat face of each coil of the coil spring comes into contact with a flat face of an adjacent coil to receive the load stably and suppress displacement in a diameteral direction of the coil.

In the coil spring, however, stress acting on an inner side portion in the diametral direction of the coil (an inner diameter side portion) is generally higher than stress acting on an outer side portion in the diametral direction of the coil (an outer diameter side portion). In this way, bias of the stress is generated to deteriorate stress dispersion. In addition to the bias, providing the flat faces further deteriorates stress dispersion in a circumferential direction in a cross section of the spring wire.

On the other hand, when the flat faces are provided on the spring wire of the coil spring, smaller oblateness in the cross section of the spring wire is advantageous in designing a low stiffness spring with longer stroke because a close contact length (height) that is a length in an axial direction of the coil spring in the close contact state becomes shorter.

Figure 13:
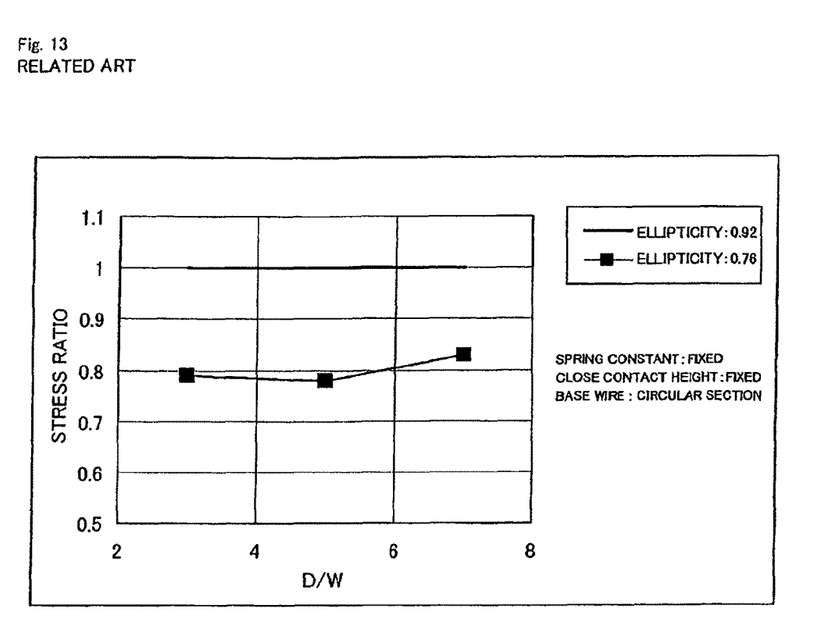
FIG. 13 is a graph showing a relationship between a spring index D/W and a stress ratio due to a difference in oblateness T/W (Related art).
Figure 14:
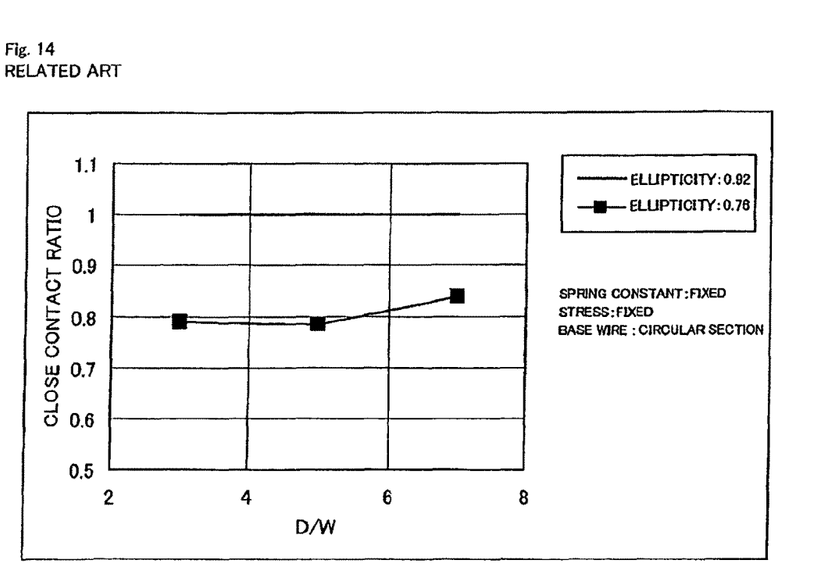
FIG. 14 is a graph showing a relationship between a spring index D/W and a close contact height ratio due to a difference in oblateness T/W (Related art).

FIG. 13 is a graph showing a relationship between a spring index D/W and a stress ratio due to a difference in oblateness T/W, and FIG. 14 is a graph showing a relationship between a spring index D/W and a close contact height ratio due to difference in oblateness T/W. The symbols of T, W and D are the same as the symbols of a spring wire 101 shown in FIG. 15. Namely, T denotes the maximum thickness in an axial direction of a coil spring, W denotes the maximum width in a radial direction of a coil, and D denotes a coil mean diameter.

In FIG. 13, it shows measurement results in stress ratio obtained from coil springs each having flat faces provided on a spring wire with a circular section in state of fixing spring constant and a close contact height. In FIG. 14, it shows measurement results in close contact height ratio obtained from coil springs each having flat faces provided on a spring wire with a circular section in state of fixing spring constant and stress. In FIGS. 13 and 14, stress change with respect to the spring index D/W at the oblateness T/W=0.92 is set in value of 1, and the stress ratios or the close contact height ratios at the oblateness T/W=0.76 are plotted with reference to the stress change at the oblateness T/W=0.92.

As is apparent from FIGS. 13 and 14, both the stress and the close contact height at the oblateness T/W=0.76 are smaller than those at the oblateness T/W=0.92.

Figure 15:
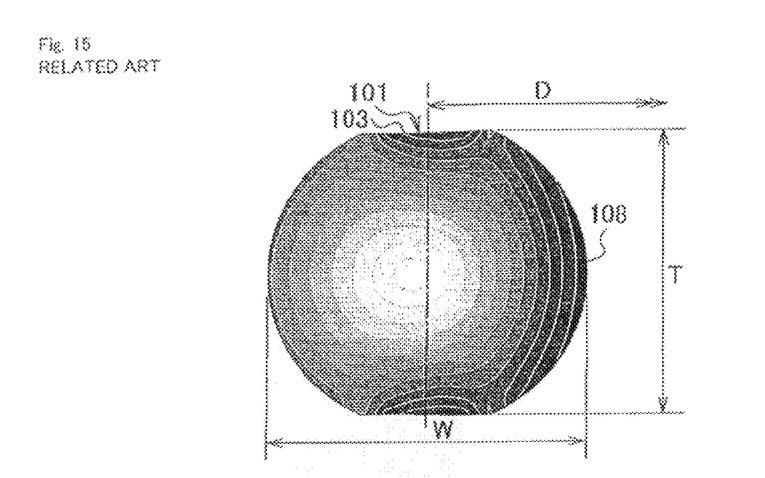
FIG. 15 is an explanatory diagrams each showing an analysis result of a stress distribution based upon the infinite element method (Related art).
Figure 16:
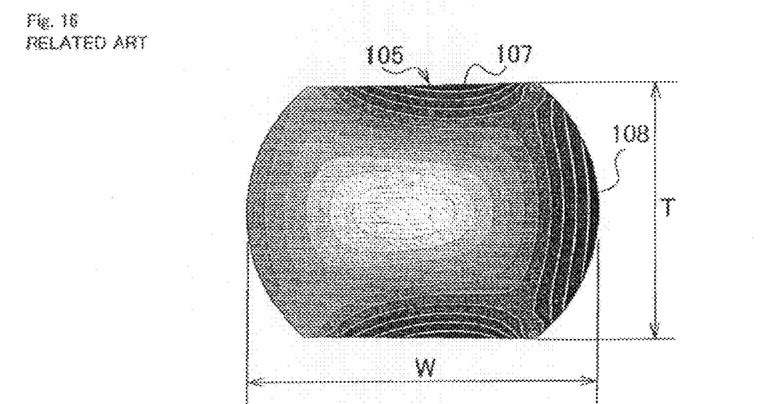
FIG. 16 is an explanatory diagrams each showing an analysis result of a stress distribution based upon the infinite element method (Related art).

FIGS. 15 and 16 are explanatory diagrams each showing analysis results of stress distribution based upon the finite element method in a cross section of a spring wire of a conventional coil spring. A spring wire 101 is made of a circular base wire with a circular section and has flat faces 103 formed on the base wire by wiredrawing to set oblateness T/W in 0.92. A spring wire 105 is made of a circular base wire with a circular section and has flat faces 107 formed on the base wire by wiredrawing to set oblateness T/W in 0.76.

As is apparent from comparison between FIGS. 15 and 16, by forming the flat faces 103 and 107, the spring wires 101 and 105 each made of the circular base wire with the circular section can disperse stresses at inner diameter side portions 108 up to the flat faces 103 and 107. In this way, stress dispersion in a circumferential direction can be achieved according to reduction of the oblateness T/W. However, continuity of the stress distribution lowers in a circumferential direction, so that forming the flat faces 103 or 107 on the circular base to reduce oblateness prevents evenness of stress.

Figure 17:
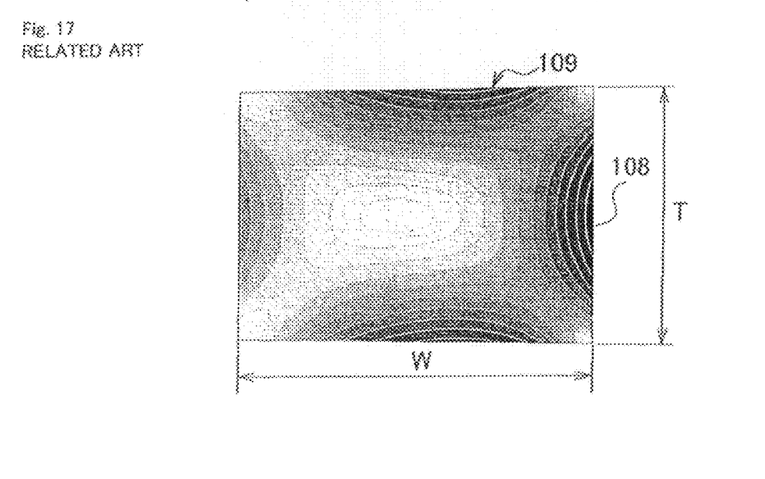
FIG. 17 is an explanatory diagrams each showing an analysis result of a stress distribution based upon the infinite element method (Related art).

FIG. 17 shows an analysis result of a stress distribution based upon the infinite element method like FIGS. 15 and 16. A spring wire 109 is made of a rectangular base wire with a rectangular section. Even in a case of the spring wire 109 having the rectangular section, stress acting on an inner diameter side portion 108 can be dispersed and a load can be stably received in a close contact state like the cases shown in FIGS. 15 and 16.

However, the spring wire shown in FIG. 17 is lower in continuity of the stress dispersion in a circumferential direction than the spring wire with the same oblateness T/W=0.76 shown in FIG. 16.

That is, a conventional coil spring including flat faces provided on a spring wire with a circular section or a rectangular section has a problem that evenness of stress distribution is prevented according to intermittence of stress dispersion in a circumferential direction in a cross section.

Patent Literature 1: Japanese Unexamined Patent Application Publication No. H06-300065
Patent Literature 2: Japanese Unexamined Patent Application Publication No. H10-82440

SUMMARY OF THE INVENTION

An object of the present invention is to provide a coil spring capable of achieving continuity of stress dispersion in a circumferential direction in a cross section to improve evenness of stress distribution while receiving load stably in a close contact state and reducing the oblateness to shorten a close contact length.

In order to accomplish the object, an aspect of the present invention provides a coil spring including a spring wire wound in a coil shape having an outer diameter side portion and inner diameter side portion in a cross section. One of the outer diameter side portion or the inner diameter side portion is formed in a semi-circular shape expressed by $x^2+y^2=b^2$, and the other thereof is formed in a non-circular shape with a long diameter "a" and a short diameter "b" expressed by $(x/a)^\alpha+(y/b)^\alpha=1$. In the expression, value of the "α" is set in a range of 1.85 to 2.45. The coil spring further includes contact faces provided between the inner diameter side portion and the outer diameter side portion on the peripheral shape in the cross section of the spring wire such that each contact face of each coil comes into contact with a contact face of an adjacent coil in an axial direction of the coil spring.

According to an aspect of the present invention, continuity of stress dispersion in a circumferential direction in a cross section can be achieved to improve evenness of stress distribution while receiving load stably in a close contact state and reducing the oblateness to shorten a close contact length.

DETAILED DESCRIPTION OF THE INVENTION

An embodiment of the present invention forms flat faces on a peripheral shape in a cross section of a spring wire including one of an outer diameter side portion or an inner diameter side portion is formed in a semi-circular shape expressed by $x^2+y^2=b^2$ and the other thereof is formed in a non-circular shape with a long diameter "a" and a short diameter "b" expressed by $(x/a)^\alpha+(y/b)^\alpha=1$. As this result, continuity of stress dispersion in a circumferential direction in a cross section can be achieved to improve evenness of stress distribution while receiving load stably in a close contact state and reducing the oblateness to shorten a close contact length.

Embodiment 1

Coil Spring

Figure 1:
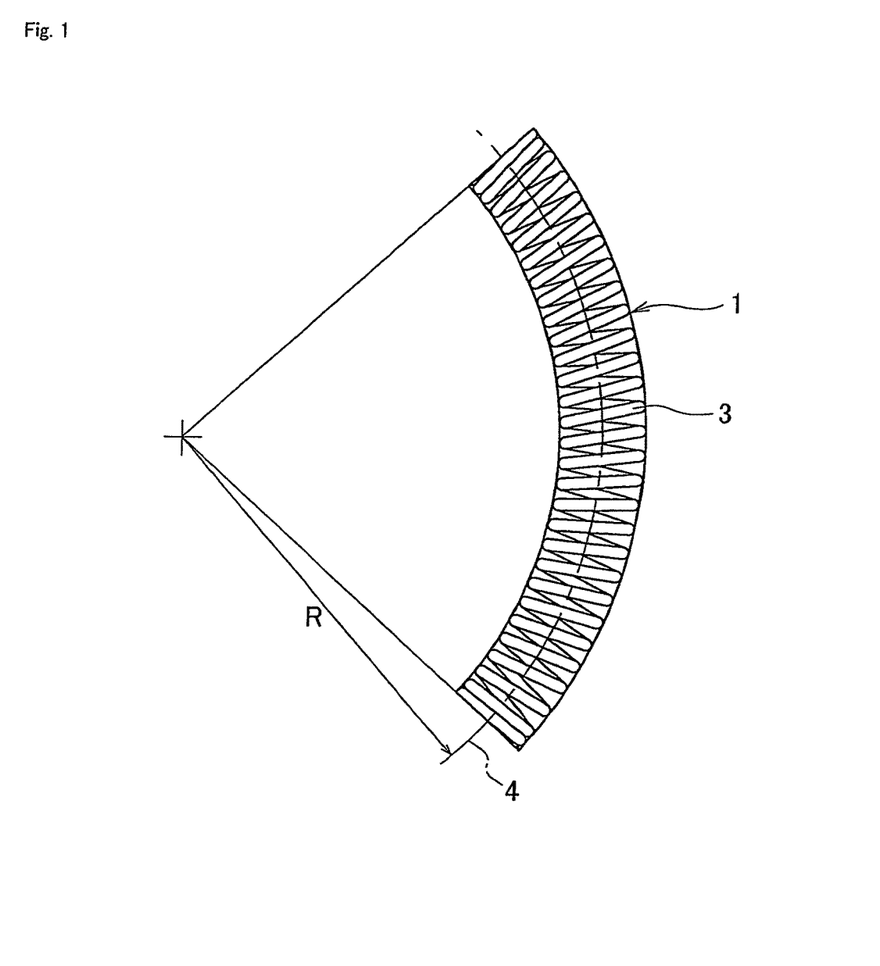
FIG. 1 is a front view showing a coil spring (Embodiment 1).
Figure 2:
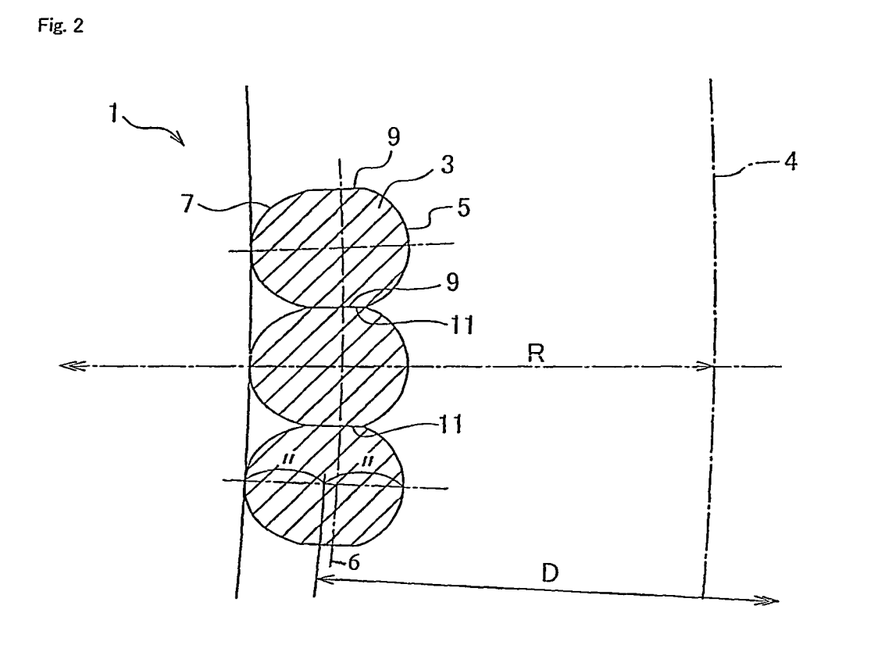
FIG. 2 is an enlarged sectional view partly showing an inner side in a radial direction of an arc shape of the coil spring of FIG. 1 (Embodiment 1).
Figure 3:
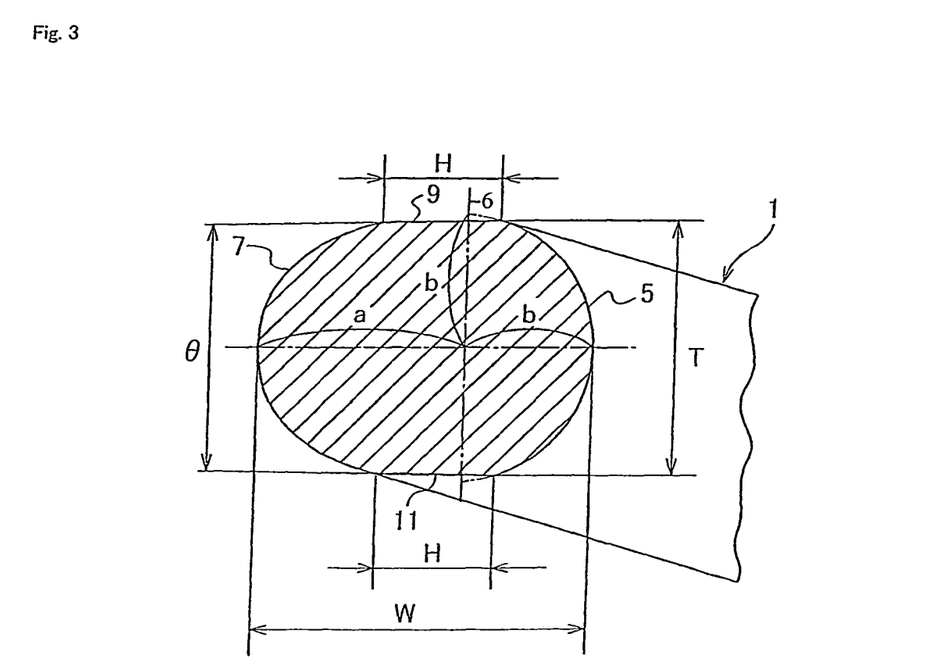
FIG. 3 is an enlarged sectional view showing a spring wire of the coil spring of FIG. 1 (Embodiment 1).
Figure 4:
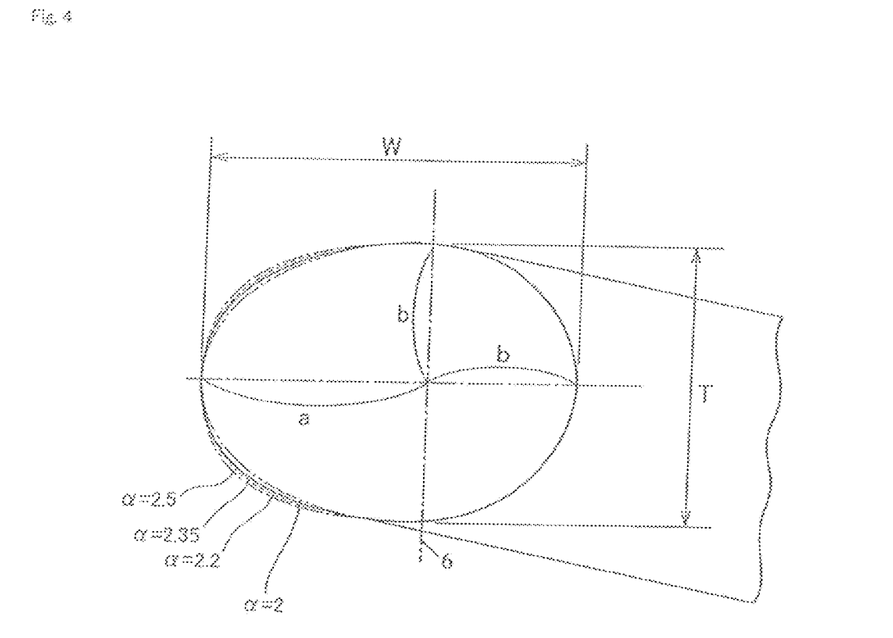
FIG. 4 is a sectional view showing a peripheral shape of a base wire used for the spring wire of the coil spring of FIG. 1 (Embodiment 1).

FIG. 1 is a front view showing a coil spring according to an embodiment 1 of the present invention, FIG. 2 is an enlarged sectional view partly showing an inner side portion in a radial direction of an arc shape of the coil spring, FIG. 3 is an enlarged sectional view showing a spring wire of the coil spring, and FIG. 4 is a sectional view showing a peripheral shape of a base wire used for the spring wire.

A coil spring 1 shown in FIG. 1 is assembled in such as torsional dampers (torsional vibration absorbing devices) of dual mass flywheels, lock-up mechanisms for torque converters or frictional disks designed for wet or dry clutch system. The coil spring 1 comprises a spring wire 3 wound in a coil shape. The coil spring 1 has an axis line 4 with an arc shape in a free state thereof, and the curvature radius R of the arc shape corresponds to a curvature radius in an assembled state.

As shown in FIGS. 2 to 4, the spring wire 3 for the coil spring 1 is made of a base wire (FIG. 4) whose peripheral shape in a cross section has an inner diameter side portion 5 that is an inner side portion in a diametral direction of the coil and an outer diameter side portion 7 that is an outer side portion in the diametral direction of the coil. The inner diameter side portion 5 is formed in a semi-circular shape expressed by $x^2+y^2=b^2$, in which "b" is a short diameter. The outer diameter side portion 7 is formed in a non-circular shape with a long diameter "a" and a short diameter "b" in which each diameter "a" and "b" is measured from a reference line 6 that is parallel to axis line 4 and which passes through the center of the semi-circular and non-circular shapes, the non-circular shape being expressed by $(x/a)^+ +(y/b)^+=1$. On the peripheral shape of the base wire, flat faces 9 and 11 serving as contact faces are provided, to form the spring wire 3. According to the embodiment, value of "α" is set in a range of 1.85 to 2.45.

As shown in FIGS. 2 and 3, the flat faces 9 and 11 are provided on both sides in an axial direction of the coil spring 1 in a cross section of the spring wire 3. The flat faces 9 and 11 are inclined to gradually come close to each other such that the cross section of the spring wire 3 forms a wedge shape. In this embodiment, inclinations of the flat faces 9 and 11 extend along a direction of a curvature radius of the arc shape of the coil spring 1. A width H of each of the flat faces 9 and 11 depends on an oblateness T/W and it is set to satisfy T/W=0.76 in this embodiment.

A mutual angle θ of the flat faces 9 and 11 and the maximum thickness T on the inner diameter side portion 5 is set on the basis of the oblateness T/W and the inclination setting. The center of the mutual angle θ is the center of curvature of the coil spring 1.

[Stress Dispersion]

Figure 5:
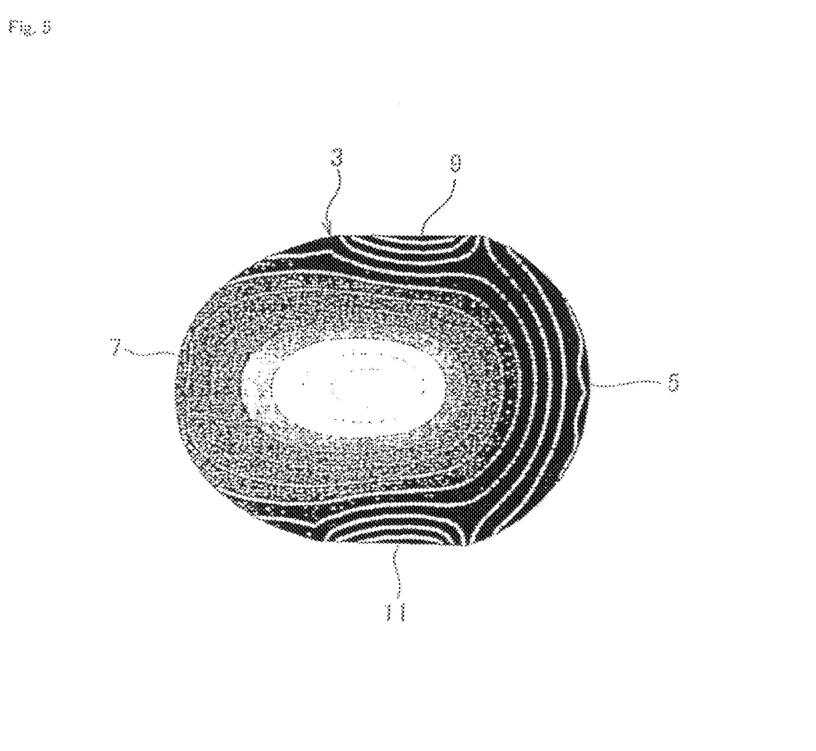
FIG. 5 is an explanatory diagrams each showing an analysis result of a stress distribution based upon the infinite element method (Embodiment 1).

FIG. 5 is an explanatory diagram showing an analysis result of a stress distribution based upon the infinite element method. As shown in FIG. 5, stress acting on the inner diameter side portion 5 is continuously dispersed up to the flat faces 9 and 11 in the spring wire 3 owing to formation of the flat faces 9 and 11. As is apparent from comparison with the example of FIG. 15 that has the same oblateness as FIG. 5, the embodiment of the present invention in FIG. 5 can reliably improve continuity and evenness of stress dispersion of the spring wire 3 while reducing the oblateness of the spring wire 3.

Figure 6:
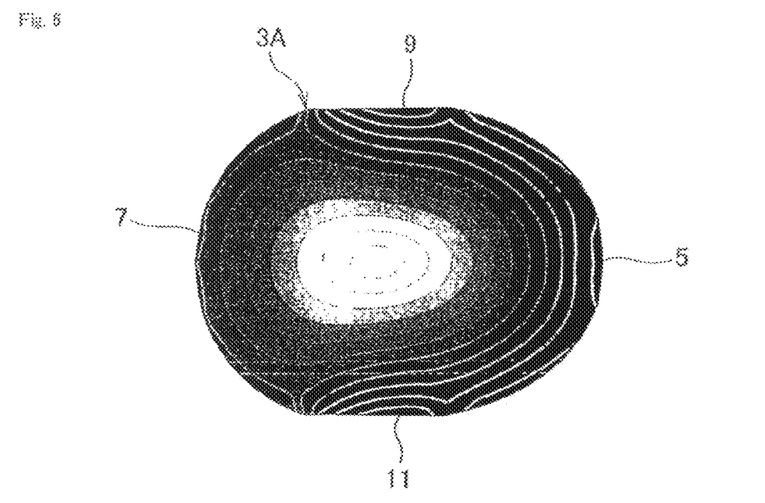
FIG. 6 is an explanatory diagrams each showing an analysis result of a stress distribution based upon the infinite element method (Embodiment 1).

The shapes of the inner diameter side portion 5 and the outer diameter side portion 7 may be reversed as shown in FIG. 6.

FIG. 6 is an explanatory diagram showing an analysis result of a stress distribution based upon the infinite element method according to a modification of the embodiment of the present invention. According to the modification, a spring wire 3A is made of a base wire whose peripheral shape in a cross section has an inner diameter side portion 5 and an outer diameter side portion 7. The outer diameter side portion 7 is formed in a semi-circular shape expressed by $x^2+y^2=b^2$. The inner diameter side portion 5 is formed in a non-circular shape with a long diameter "a" and a short diameter "b" expressed by $(x/a)^\alpha+(y/b)^\alpha=1$. On the peripheral shape of the base wire, flat faces 9 and 11 serving as contact faces are provided, to form the spring wire 3A. As shown in FIG. 6, the modification can reliably achieve continuity and evenness of stress dispersion of the spring wire 3A while reducing the oblateness of the spring wire 3A. Additionally, the continuity and evenness of stress dispersion in the modification can be further improved as compared with the coil spring 1 shown in FIG. 5.

The coil spring made of the base wire having the same peripheral shape as FIG. 6 with no flat face has been already proposed by the present applicant in an Examined patent application publication No. 06-23583.

[Stress Ratio, Close Contact Height Ratio, and Weight Ratio]

Figure 7:
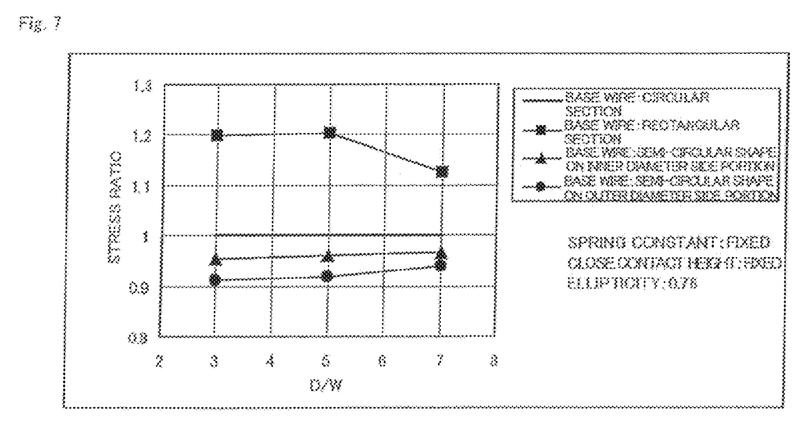
FIG. 7 is a graph showing a relationship between a spring index D/W and a stress ratio due to a difference in a base wire (Embodiment 1).
Figure 8:
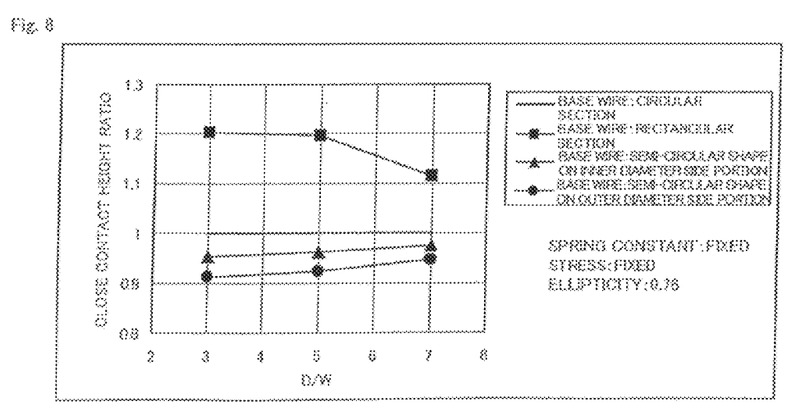
FIG. 8 is a graph showing a relationship between a spring index D/W and a close contact height ratio due to a difference in a base wire (Embodiment 1).
Figure 9:
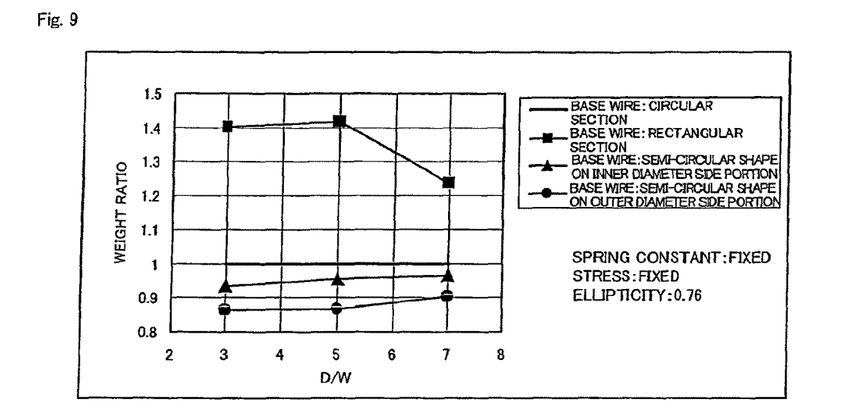
FIG. 9 is a graph showing a relationship between a spring index D/W and a weight ratio due to a difference in base a wire (Embodiment 1).
Figure 10:
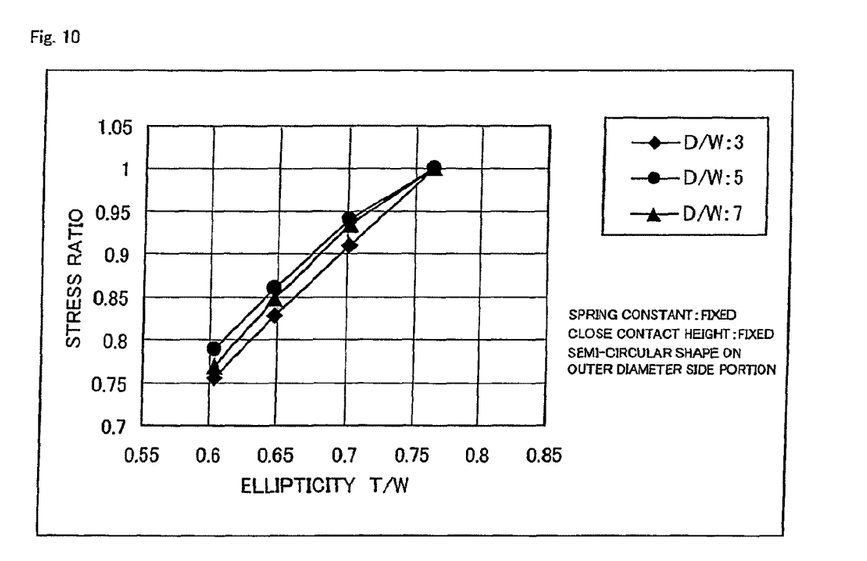
FIG. 10 is a graph showing a relationship between an oblateness T/W and a stress ratio due to a difference in spring index D/W (Embodiment 1).
Figure 11:
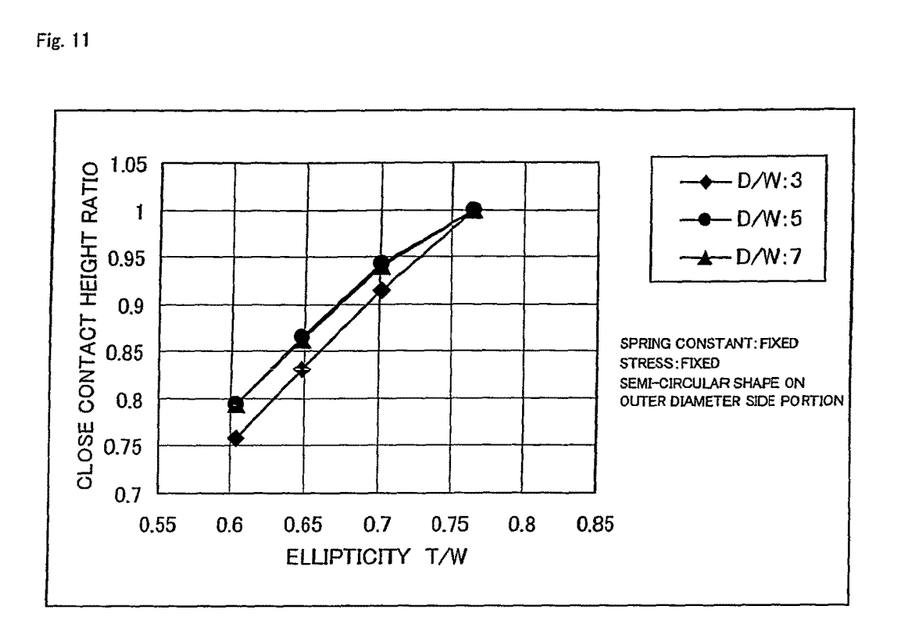
FIG. 11 is a graph showing a relationship between an oblateness T/W and a close contact height ratio due to a difference in spring index D/W (Embodiment 1).

FIG. 7 is a graph showing a relationship between a spring index D/W and a stress ratio due to a difference in a peripheral shape (base wire), FIG. 8 is a graph showing a relationship between a spring index D/W and a close contact height ratio due to a difference in a base wire, FIG. 9 is a graph showing a relationship between a spring index D/W and a weight ratio due to a difference in a base wire, FIG. 10 is a graph showing a relationship between an oblateness T/W and a stress ratio due to a difference in spring index D/W, and FIG. 11 is a graph showing a relationship between an oblateness T/W and a close contact height ratio due to a difference in spring index D/W.

In each of FIGS. 7 to 9, it employs objective coil springs including flat faces provided on spring wires whose peripheral shapes of base wires are a circular shape, a rectangular shape, a semi-circular shape on an inner diameter side (corresponding to the cross section of FIG. 5), and a semi-circular shape on an outer diameter side (corresponding to the cross section of FIG. 6), respectively. FIG. 7 shows measurement results in stress ratio obtained from the objective coil springs each having oblateness T/W=0.76 in state of fixing spring constant and a close contact height. FIG. 8 shows measurement results in a close contact height obtained from the objective coil springs each having oblateness T/W=0.76 in state of fixing spring constant and stress. FIG. 9 shows measurement results in weight ratio obtained from the objective coil springs each having oblateness T/W=0.76 in state of fixing spring constant and stress. In FIGS. 7 to 9, value of the spring wire made of the circular base wire with the circular section is set in 1, and the stress ratios, the close contact height ratios, or the weight ratios with respect to spring indexes D/W of the spring wires whose peripheral shapes of base wires are the rectangular shape, the semi-circular shape on an inner diameter side (corresponding to the cross section of FIG. 5), and the semi-circular shape on an outer diameter side (corresponding to the cross section of FIG. 6) are plotted with reference to the set value of 1.

As shown in FIGS. 7 to 9, all of the stress ratios, the close contact height ratios, and the weight ratios of the spring wires each made of the base wire with the rectangular section are largely exceeded those of the spring wire with the circular section. On the other hand, all of the stress ratios, the close contact height ratios, and the weight ratios of the spring wires whose base wires with the semi-circular shape on the inner diameter side (corresponding to the cross section of FIG. 5), and the semi-circular shape on the outer diameter side (corresponding to the cross section of FIG. 6) are fallen below those of the spring wire with the circular section.

In FIG. 10, it shows measurement results in stress ratio obtained from coil springs each having flat faces provided on a spring wire whose peripheral shape of a base wire is a semi-circular shape on an outer diameter side (corresponding to the cross section of FIG. 6) in state of fixing spring constant and a close contact height. In FIG. 11, it shows measurement results in a close contact height ratio obtained from coil springs each having flat faces provided on a spring wire whose peripheral shape of a base wire is a semi-circular shape on an outer diameter side (corresponding to the cross section of FIG. 6) in state of fixing spring constant and stress. In FIGS. 10 and 11, stresses or close contact heights at the oblateness T/W=0.76 are set in value of 1, and stress ratios or close contact height ratios at the other oblatenesses are plotted with reference to the set value of 1.

As shown in FIGS. 10 and 11, similar change tendencies of the stress and the close contact height could be obtained according to reduction of the oblateness in each spring index D/W.

["α" and a Stress Ratio]

Figure 12:
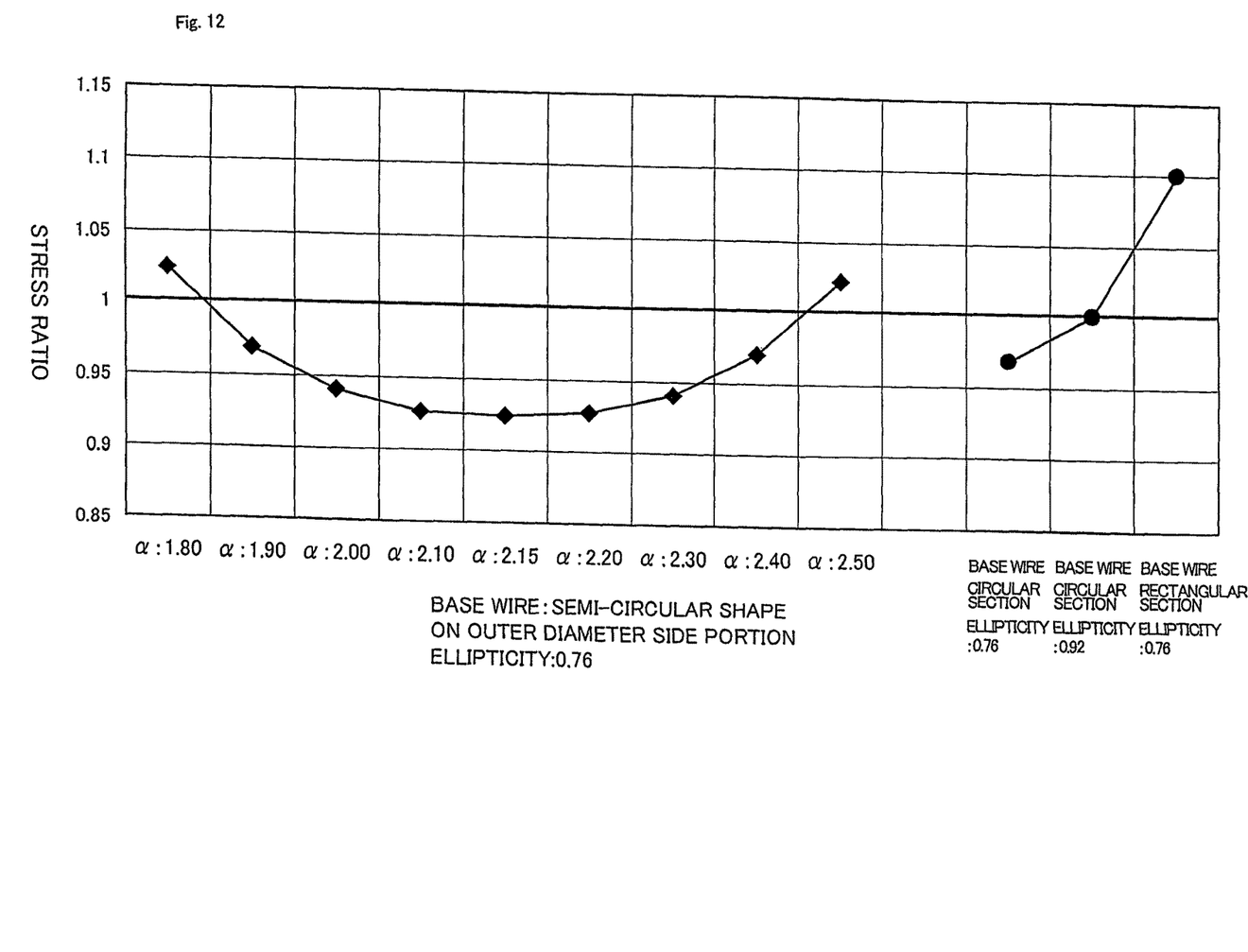
FIG. 12 is a graph showing change in stress ratio on the basis of change in a value of "α" of a spring wire whose base wire has a semi-circular shape on an outer diameter side portion (Embodiment 1).

FIG. 12 is a graph showing change in the stress ratio on the basis of change in value of "α" of a spring wire. In FIG. 12, it shows measurement results obtained from coil springs each comprising a spring wire with oblateness T/W=0.76 whose peripheral shape of a base wire is a semi-circular shape on an outer diameter side (corresponding to the cross section of FIG. 6) in state of fixing spring constant, an outer diameter of a coil, a close contact height. In FIG. 12, stress ratios of two examples with the oblateness T/W=0.76 and the oblateness T/W=0.92 each having a circular section and one example with the oblateness T/W=0.76 having a rectangular section are also shown as comparative examples.

As shown in FIG. 12, stress ratio at the oblateness T/W=0.92 is set in value of 1, and stress ratios at the other oblatenesses are plotted with reference to the set value of 1 to specify a range of the stress ratio less than the set value of 1. As is apparent from FIG. 12, the range of the stress ratio less than the set value of 1 is a range of α=1.85 to 2.45. When the range of α=1.85 to 2.45 is adopted, the embodiment is advantageous in design over the comparative example with oblateness T/W=0.92 with a circular section.

Effect of Embodiment 1

According to the embodiment of the present invention, the coil spring 1 comprises the spring wire 3 wound in a coil shape having the inner diameter side portion 5 and outer diameter side portion 7 in the cross section. One of the outer diameter side portion 7 or inner diameter side portion 5 is formed in the semi-circular shape expressed by $x^2+y^2=b^2$, and the other thereof is formed in the non-circular shape with a long diameter "a" and a short diameter "b" expressed by $(x/a)^\alpha+(y/b)^\alpha=1$. The value of the "α" is set in a range of 1.85 to 2.45. The coil spring 1 further includes flat faces 9 and 11 provided between the inner diameter side portion 5 and the outer diameter side portion 7 on the peripheral shape of the spring wire in the cross section such that each flat face of each coil comes into contact with a flat face 9 or 11 of an adjacent coil in the axial direction along the axis line 4 of the coil spring 1. Therefore, continuity of stress dispersion in the circumferential direction in the cross section of the spring wire 3 or 3A can be achieved to improve evenness of stress distribution while receiving load stably in the close contact state or locked state and reducing the oblateness to shorten a close contact length.

Therefore, quality enough to design a coil spring having low rigidity and a long stroke required for a coil spring applied to a torsional damper or the like can be obtained easily. And this also enables to easily improve filtering function, that is, reduction of noise and vibration, in dynamic condition. This function is required for torsional dampers (torsional vibration dampers) to be assembled in engine system.

The flat faces 9 and 11 are provided on both sides in the cross section of the spring wire 3 in the axial direction along the axis line 4, so that load in the axial direction in the close contact state or locked state can be reliably received to suppress displacement in the radial direction.

The flat faces 9 and 11 are inclined to gradually come close to each other such that the cross section of the spring wire 3 forms a wedge shape. Therefore, even if the axis line 4 is arc shape, load in the axial direction can be received reliably to suppress displacement in the coil radius direction.

Especially, in the case of forming the coil outer diameter side portion 7 in the non-circular shape, the flat faces 9 and 11 can be formed at an inner side in the radial direction of the arc shape of the coil spring 1 without significant impact on the cross section of the spring wire 3.

The coil shape of the spring wire 3 is set to have an arc shape in the axis line 4 in the free state, so that it can facilitate to assemble the coil spring 1 in an arc shape. The coil shape of the spring wire 3 can be easily set according to the flat faces 9 and 11 and the arc shape of the axis line 4.

The coil spring 1 has a curvature radius R of the axis line 4 at assembly. This ensures easier assembly process and freedom in design to accommodate curvature of the coil axis 4 of the flat faces 9 and 11.

The coil spring 1 is assembled in torsional damper (torsional vibration absorbing device) of dual mass flywheels, lock-up mechanisms for torque converters or friction disks designed for dry or wet clutch mechanism. This enables application of coil springs of longer stroke and low stiffness.

Other Embodiments

The contact faces are not only the flat faces 9 and 11 but also may be a small convex surface or a small concave surface. One of the contact faces on one side in a direction of the coil axis line 4 of the spring coil 3 can be formed in a small convex surface while the other thereof can be formed in a small concave surface.

The invention claimed is:
1. A coil spring comprising:
a spring wire wound in a coil shape having an outer diameter side portion and an inner diameter side portion on a peripheral shape in a cross section thereof, the outer diameter side portion formed in a semi-circular shape expressed by $x^2+y^2=b^2$ in which "b" is a short diameter, the inner diameter side portion formed in a non-circular shape with a long diameter "a" and the short diameter "b" expressed by $(x/a)^\alpha+(y/b)^\alpha=1$ wherein each of "a" and "b" is measured from a reference line that passes axially through a center of each of the semi-circular and non-circular shapes and which is measured in the width direction of the coil spring, and the value of the "α" set in a range of 1.85 to 2.45;
the coil shape of the spring wire is set to have an arc shape along an axis line of the coil spring in a free state;
contact faces provided on both sides of the spring wire along the axis line of the coil spring, each contact face being provided between the inner diameter side portion and the outer diameter side portion on the peripheral shape in the cross section and being configured so as to extend from a region of the non-circular shape to a region of the semi-circular shape such that each contact face comes into contact with a contact face of an adjacent coil in the axial direction of the coil spring, in which "T" is a maximum thickness of the spring wire in the axial direction of the coil spring, "W" is a maximum width of the spring wire in a diametral direction of the coil spring, and "H" is a width of each contact face of the spring wire in the diametral direction of the coil spring so that a size of the width "H" is determined by the relative value of an oblateness T/W and the value of "α" when set in the range of 1.85 to 2.45; and
each contact face having a width at the region of the non-circular shape in the diametral direction of the coil spring that is larger than a width of said each contact face at the region of the semi-circular shape in the diametral direction of the coil spring, said diametral direction extending in the direction along which the diameter of the coil spring is measured when said coil spring is viewed in cross section and wherein said respective widths of said regions at said respective non-circular and semi-circular shapes in the diametral direction of the coil spring are measured relative to said reference line that passes axially through the center of the non-circular and semi-circular shapes whereby said reference line is parallel to said axis line of the coil spring.

2. The coil spring of claim 1, wherein
the contact faces are each formed in a flat face.

3. The coil spring of claim 1 or 2, wherein
the contact faces are provided on both sides on the peripheral shape in the cross section of the spring wire in the axial direction.

4. The coil spring of claim 3, wherein
both the contact faces are inclined such that the cross section of the spring wire becomes a wedge shape.

5. The coil spring of claim 1 or 2, wherein
the arc shape has a curvature radius corresponding to a curvature radius in an assembled state.

6. The coil spring of claim 1 or 2, wherein
the coil spring is used in a torsional damper of a dual mass flywheel, a lock-up mechanism for a torque converter or a frictional disk designed for a wet or dry clutch system.

7. The coil spring of claim 1, wherein
a stress ratio of the spring wire comprises a value less than 1, said stress ratio being set with an oblateness T/W=0.92 relative to a circular section of the spring wire.

8. The coil spring of claim 1, wherein the "α" is set in a range of 2.1 to 2.4.

9. The coil spring of claim 1, wherein the oblateness T/W is set within a range of 0.6≤T/W≤0.76.

10. A coil spring comprising:
a spring wire wound in a coil shape having an outer diameter side portion and an inner diameter side portion on a peripheral shape in a cross section thereof, the inner diameter side portion being formed in a semi-circular shape expressed by $x^2+y^2=b^2$ in which "b" is a short diameter, the outer diameter side portion being formed in a non-circular shape with a long diameter "a" and the short diameter "b" expressed by $(x/a)^\alpha+(y/b)^\alpha=1$ wherein each of "a" and "b" is measured from a reference line that passes axially through a center of each of the semi-circular and non-circular shapes and which is measured in the width direction of the coil spring, and the value of the "α" set in a range of 1.85 to 2.45;
the coil shape of the spring wire is set to have an arc shape along an axis line of the coil spring in a free state; and
contact faces provided on both sides of the spring wire along an axis line of the coil spring, each contact face being provided between the inner diameter side portion and the outer diameter side portion on the peripheral shape in the cross section and being configured so as to extend from a region of the non-circular shape to a region of the semi-circular shape such that each contact face comes into contact with a contact face of an adjacent coil in the axial direction along an axis line of the coil spring, and each contact face having a width at the region of the non-circular shape in the diametral direction of the coil spring that is larger than a width of said each contact face at the region of the semi-circular shape in the diametral direction of the coil spring, said diametral direction extending in the direction along which the diameter of the coil spring is measured when said coil spring is viewed in cross section and wherein said respective widths of said regions at said respective non-circular and semi-circular shapes in the diametral direction of the coil spring are measured relative to said reference line that passes axially through the center of the non-circular and semi-circular shapes whereby said reference line is parallel to said axis line of the coil spring.

11. The coil spring of claim 10, wherein the "$\alpha$" is set in a range of 2.1 to 2.4.

12. The coil spring of claim 10, wherein the oblateness T/W is set within a range of $0.6 \leq T/W \leq 0.76$, in which
"T" is a maximum thickness of the spring wire in the axial direction of the coil spring and "W" is a maximum width of the spring wire in the diametral direction of the coil spring.

13. A coil spring comprising:
a spring wire wound in a coil shape having an outer diameter side portion and an inner diameter side portion on a peripheral shape in a cross section thereof, the outer diameter side portion formed in a semi-circular shape expressed by $x^2+y^2=b^2$ in which "b" is a short diameter, the inner diameter side portion formed in a non-circular shape with a long diameter "a" and the short diameter "b" expressed by $(x/a)^\alpha+(y/b)^\alpha=1$ wherein each of "a" and "b" is measured from a reference line that passes axially through a center of each of the semi-circular and non-circular shapes and which is measured in the width direction of the coil spring, and the value of the "$\alpha$" set in a range of 1.85 to 2.45;

the coil shape of the spring wire is set to have an arc shape along an axis line of the coil spring in a free state;

contact faces provided on both sides of the spring wire along the axis line of the coil spring, each contact face being provided between the inner diameter side portion and the outer diameter side portion on the peripheral shape in the cross section and being configured so as to extend from a region of the non-circular shape to a region of the semi-circular shape such that each contact face comes into contact with a contact face of an adjacent coil in the axial direction of the coil spring; and each contact face having a width at the region of the non-circular shape in the diametral direction of the coil spring that is larger than a width of said each contact face at the region of the semi-circular shape in the diametral direction of the coil spring, said diametral direction extending in the direction along which the diameter of the coil spring is measured when said coil spring is viewed in cross section and wherein said respective widths of said regions at said respective non-circular and semi-circular shapes in the diametral direction of the coil spring are measured relative to said reference line that passes axially through the center of the non-circular and semi-circular shapes whereby said reference line is parallel to said axis line of the coil spring.

14. The coil spring of claim 13, wherein the "$\alpha$" is set in a range of 2.1 to 2.4.

15. The coil spring of claim 13, wherein the oblateness T/W is set within a range of $0.6 \leq T/W \leq 0.76$, in which
"T" is a maximum thickness of the spring wire in the axial direction of the coil spring and "W" is a maximum width of the spring wire in the diametral direction of the coil spring.

\* \* \* \* \*